United States Patent Office 2,914,444
Patented Nov. 24, 1959

2,914,444

CELLULOSIC HEMOSTATIC COMPOSITION

David F. Smith, Piscataway Township, N.J.

No Drawing. Application December 12, 1950
Serial No. 200,492

8 Claims. (Cl. 167—65)

This invention relates to novel compositions of matter and to methods for producing them. In one of its more specific aspects the invention is directed to novel compositions of matter which serve as excellent hemostatic agents capable of being absorbed in live animal tissue. In the course of my work on hemostasis and experimentation in the production of organic compounds, I have discovered certain derivatives of high molecular weight polysaccharides, such as starch, inulin and cellulose to be admirably suitable for use by the surgeon in the course of performing certain operations on animals. I have discovered that certain cellulose, starch and inulin sulphuric acid compounds and also certain cellulose, starch and inulin acid ethers and derivatives of said compounds are spectacularly suitable as hemostatic agents when used for this purpose either alone, in various proportions and combinations with each other, and/or with other compounds and materials.

For the sake of brevity, the invention will be particularly described with reference to a particular polysaccharide, namely cellulose. It is to be understood that in general, starch or inulin may be employed in place of "Cellulose A," hereinafter identified.

The cellulose sulphuric acid compounds of this invention have an average of 1 to 3 ($OSO_3H$) groups in place of the OH groups present in cellulose which is made up of a plurality of units, each of which has the general formula $C_6H_7O_2(OH)_3$. Some of the derivatives of cellulose sulphuric acid within the purview of this invention are the salts of said cellulose sulphuric acid compounds, and are the sulphuric acid compounds wherein the H of the ($OSO_3H$) groups has been replaced by a metal, such as sodium, potassium, calcium, magnesium, aluminum and/or radicals, such as pyridine, quinoline, ammonium, etc. and in such instances all or only part, say 10–100% of ($OSO_3H$) groups of the cellulose sulphuric acid compounds may be converted to the salt groups, which, when sodium is the substituent, may be represented as ($OSO_3Na$), for the purpose of illustration.

The cellulose acid either compounds of this invention have an average of 0.5 to 3.0 ($ORyCOOH$) groups in place of the OH groups present in said cellulose units, in which R is a $CH_2$ group and y is a whole number in the range of 1 to 3. Some derivatives of these cellulose acid ethers are their salts, in which the H of said ($ORyCOOH$) groups has been replaced by one of the aforesaid metal or organic radicals and, when sodium, may be represented as ($ORyCOONa$), and in such instances all or only part, 10–100% of the ($ORyCOOH$) groups of the acid ethers may be converted to the salt groups.

Mixtures of cellulose acid ethers and cellulose sulphuric acid compounds as well as the salts thereof are also within the purview of this invention as well as compounds in which the cellulose units contain both $OSO_3H$ and $ORyCOOH$ groups in place of the OH groups of said cellulose. They also may be in the form of their salts.

All of the aforementioned compounds may find utility in the field of hemostasis when used either alone or two or more of them in combination with each other.

Besides exhibiting a marked hemostatic action on the blood of animals, they are readily absorbable in normal, live animal tissue and do not cause undue irritation of the tissue or appreciable toxic effects. Consequently, these compounds may be employed by the surgeon as hemostatic agents in the course of his operation and may be allowed to remain in the wound after the operation has been completed.

This is a great advance, because heretofore it has been the general practice for the surgeon, as he makes an incision, to pack the wound with cotton gauze, put pressure on the bleeding area and maintain the pressure for some time until the blood clots by the normal process of contact with air. This requires considerable time and even so, usually does not completely stop the bleeding. He must then, from time to time during the operation, clear the blood from the working area with gauze sponges. When the operation is practically finished and before final suturing, he must remove the gauze from the wound which many times results in recurrence of bleeding, and, while rarely, it does sometimes happen that a sponge is inadvertently allowed to remain in the wound after the operation has been completed and the wound sutured, which of course is highly undesirable.

The disadvantages of performing operations and using the ordinary gauze and sponges to take care of the bleeding have been recognized for many years. One of the attempts which was made in an effort to reduce to a degree those disadvantages was proposed some years ago. This attempt involved the use of cellulose which had been oxidized by $NO_2$. While this material has been found useful, it has fallen far short of that which is required because of its several singular disadvantages, among which are:

(1) It is unstable even at ordinary temperatures.

(2) It cannot be sterilized by the ordinary methods of heat sterilization. In order to sterilize that product it is necessary to subject it to a special treatment with formaldehyde. Its physical form is not satisfactory because it is in the shape of cotton or gauze, which when treated and after treatment has a large number of interstices through which blood may pass and it may not be produced in the form of a thin continuous film or other more suitable forms. Because of this, relatively large quantities must be used.

(3) It does not adhere to bleeding tissue, and, consequently, must be held against the bleeding tissue for a certain period of time so that its hemostatic action will take effect, otherwise it will be washed away by the flow of blood.

(4) It is extremely non-uniform in composition as evidenced by the fact that one portion may be absorbed by the tissue in seven days, for example, while an adjacent portion may require 14 or more days and even up to 30 days and, moreover, often causes considerable tissue irritation.

(5) It cannot be used to coat or impregnate surgical dressings.

The compositions of the present invention are far superior to said compositions of cellulose oxidized with $NO_2$ for the following reasons:

(1) They are stable for a long period of time at the temperatures normally encountered and therefore, have the required shelf or storage life.

(2) They can be sterilized by autoclaving them in sealed containers at a temperature of approximately 240° F. for twenty minutes or more.

(3) Some of them can be made in a form having excellent adhesion to bleeding tissue and they are non-irritating and non-toxic.

(4) They are uniform in composition and properties.

(5) They may be employed to impregnate or coat surgical cotton, gauze or other woven or matted fabric which is to be placed immediately over the wound so that the blood which exudes from the wound may be congealed and the bleeding stopped. Consequently, the gauze or textile material coated and/or impregnated with my compositions may be used as the gauze component of an adhesive bandage, may also be used as a surgical dressing; and also may be used by the surgeon in the course of his operative treatment as desired; and also as uterine packing, or in other body cavities after or during an operation. When so employed it is preferable that the gauze or surgical dressing also contain a humectant such as glycerine, sorbitol or various other aliphatic polyhydric alcohols well known for this purpose, in order that the dressing may be released from the bleeding area after the bleeding has been once stopped without starting the bleeding again.

(6) They may be produced in a wide variety of different physical forms. Some of them may be made up in the form of thin films which may be readily handled and applied to a bleeding area by the surgeon much like the way so-called "Scotch tape," for example, is applied to a surface. They may be made up in the form of a film having any desired degrees of porosity. They may be made up in the form of foamy dry materials of the desired thickness. They may be made up in fibrous forms by extrusion and drying or in porous forms by drying in the frozen state, or by drying with anhydrous solvents; and the cellulose sulphuric acid compounds particularly may be precipitated out of concentrated solution in fibrous form and dried. Materials of this nature which adhere strongly to bleeding tissue may be coated with the said humectants on one side so that they do not stick to the surgeon's blood-covered glove, if desired.

(7) In all of the aforesaid cases it is possible to have modifying components therein, such as the humectants and also various thickening agents such as pectin, gelatin, etc. and foaming agents such as glyceryl monostearate as well as certain medicaments such as sulfa drugs, aureomycin, etc.

(8) They also may be made up in the forms of gels and pastes for filling body cavities, for example; and a thick paste, for example, in mixture with polyglycols, may be used as bone wax to stop the bleeding from bone marrow and also as a covering directly over the wound.

(9) These various compositions may be used as impregnants and coatings for, as well as components of, the starch and gelatin sponges now used for hemostasis.

(10) In addition, the various compositions of this invention in their acid forms may be mixed as a dry powder with sodium bicarbonate, for example, and insufflated or otherwise placed into the bleeding cavity. When the dry compositions become wet, gas is evolved causing a foaming of the mixture which fills the cavity and stops the bleeding. These mixtures may also contain any desired medicament, spermaticide or antiseptic, and provide an excellent way for spreading a medicament into a body cavity and might be especially useful for the treatment of vaginal and uterine diseases.

The sulphuric acid derivatives of cellulose may be prepared in a number of different ways. While others have prepared a sulphuric acid derivative of cellulose, no one has prepared it in such a condition as to be suitable for the purposes intended herein. According to this invention, I employ as a reactant or starting material that type of cellulose hereinafter known as "Cellulose A" characterized by having anywhere from 50 to 2000 cellulose units of chain length and represented by the following general formula $(C_6H_7O_2(OH)_3)_x$, wherein $x$ is 50–2000 and from which the oils, fats, waxes, proteins, etc. which may have been present therein have been removed by the usual alkali "boiling," bleaching, souring and washing. I may also prefer to use regenerated cellulose.

Said "Cellulose A" is first reacted with dilute $SO_3$ or with $SO_2Cl_2$ in the presence of a base such as sodium hydroxide to produce the sodium salt of cellulose sulphuric acid. I prefer, however, to first react said cellulose in dry form with chlorosulfonic acid in the presence of a weak base, such as pyridine or quinoline and especially the former and thus produce the pyridine salt of cellulose sulphuric acid. The proportions of reactants, the time and temperature of reaction; the presence of oxygen and moisture are so chosen that the extent of reaction is controlled as to the breaking of the cellulose chains and to obtain the various cellulose sulphuric acid salts, with the average degree of substitution of the cellulose being up to approximately 3 and as low as desired. The presence of moisture in the cellulose and in the pyridine should be controlled (desirably below 8%) in order to avoid hydrolysis of the product and destruction of a portion of the chlorsulfonic acid. In order to avoid degradation of the product and the formation of low molecular weight materials, oxygen or air and heavy metals impurities are preferably excluded during the initial reaction which may be carried out under an inert ambient such as nitrogen, etc.

I prefer that the degree of substitution be in the range of 0.5 to 3.0 because such material has the desired solubility characteristics. The resultant reaction mass contains the pyridine salt of cellulose sulphuric acid, pyridine hydrochloride, pyridine hydrosulfate, excess pyridine salt of chlorsulfonic acid, and possibly some unreacted cellulose. This mass is added to a dilute aqueous solution of an alkali such as sodium hydroxide, sodium carbonate (or calcium hydroxide or the like), whereupon the pyridine cellulose sulphuric acid is converted in large part to the sodium salt and most of the pyridine separates out as a top layer. Other salts, such as the potassium, calcium, magnesium, barium, ammonium, etc., may be produced in a similar manner. More concentrated NaOH can be added at this point in order to more completely separate the pyridine, keeping the mass cool in order to prevent decomposition of the product This top layer is completely removed to recover the pyridine, and the remaining bottom layer consists of an aqueous solution or dispersion of sodium cellulose sulphate together with sodium chloride, sodium sulfate, sodium hydroxide and may contain some slight amount of unreacted cellulose and some pyridine.

At this stage this lower layer may be treated in a number of different ways, some of which are as follows:

(A) A quantity of ethyl alcohol, propyl alcohol, isopropyl alcohol, acetone, or other organic liquid which is water soluble and has a low solubility factor for the sodium salt of cellulose sulphuric acid, may be added thereto in quantities sufficient to cause precipitation out of the sodium salt of cellulose sulphuric acid. Alternately an excess of NaOH may be added in order to precipitate or coagulate the product; or concentrated acid, such as HCl, may be added to precipitate out the cellulose sulphuric acid. However, if the product still contains pyridine, I prefer to precipitate with an organic solvent as indicated, in order to wash out the pyridine and not to convert the pyridine to its hydrochloride. The reaction mass may also be precipitated directly but I prefer to treat it with alkali as described in order to recover the pyridine to be dried for re-use. In adding precipitants, it is desirable not to use so much as to precipitate a large part of the $Na_2SO_4$ with the product, since this salt is not very soluble in mixtures of organic solvent and water and is difficult to remove later.

(B) The mass is now decanted or filtered and must then be freed of pyridine, $Na_2SO_4$, NaCl, etc. by one or more of several methods. It may be washed with organic solvent-water mixtures by decantation or filtering. However, it may at this point be precipitated in the acid form with HCl and washed with hydrochloric acid and alcohol in order to remove the inorganic salts. Finally, it may be washed with alcohol or alcohol-water mixtures to remove the HCl. It may be dried with strong alcohol (95% or absolute), followed by drying in a vacuum dessicator. If at any point during the washing the product becomes difficult to settle or filter, it may be washed with strong alcohol which will give a dense, compact solid. If the product contains insoluble, unreacted cellulose, a quantity of water may be added and the cellulose settled out and removed. However, it is entirely unnecessary to have any unreacted cellulose present.

The dried product after having a small amount of water added thereto is a viscous mass, known as Product X, and may be spread in the form of films on a glass plate and dried. Care should be taken in the drying operation which is dependent for its time upon the thickness of the film and also the humidity and temperature of the atmosphere in which the drying takes place. The drying is stopped when the film, while still containing a small proportion of water, is firm and dry to the touch, is resilient and flexible and is not brittle when bent over on itself over approximately a 360° arc. I find also that these films may be plasticized with liquid aliphatic polyhydric alcohols, such as, glycerol, glycols, sorbitol and similar compounds, as well as with water.

Instead of washing the precipitated sodium salt with alcohol and water as set forth in step B, this precipitate may have a small proportion of water added thereto with or without a small proportion of concentrated hydrochloric acid and placed on one side of a dialyzer to be purified by dialysis. The dialysis is stopped at the point where the pH of said mass is the range of about 2-6 as desired. This purified mass, as before, may be converted to the film form; preferably from the vacuum-evaporated dialysate.

By employing the aforesaid methods there may be produced novel cellulose sulphuric acid compounds and salts thereof in various combinations and degrees of substitution.

The cellulose sulphuric acids consist of cellulose whose OH content has been replaced by ($OSO_3H$) and the salts thereof, as for example the sodium salts are cellulose whose OH content has been replaced by ($OSO_2Na$) and, as before pointed out, the average degree of OH substitution may be in limits of 0.5 to 3 per cellulose unit. Such compounds are stable esters resistant to the action of acid or alkali.

The thickened mass, Product X, however produced, may be thinned to any desired degree of viscosity with distilled water to render it suitable for coatings and impregnations. The gelatin or starch sponges may be dipped in this solution and then dried until the film thereon of the material is firm, resilient and dry to the touch. Or, my hemostatic material may be included in the solution from which these sponges are made. In any of these cases a quantity of the desired humectant and/or medicament may be added thereto. When a foam or a gel is desired, I may prefer to first thicken the cellulose sulphuric acid, with or without its sodium salt, with sodium carboxymethyl cellulose, gelatin, pectin or etc. and/or a foaming agent to form a thickened mass in the nature of a paste; and then this may be used by itself or may be agitated and whipped to produce a foam and in either case is dried to the firm, resilient, dry-to-the-touch state. If desired, the films may contain a small proportion of either sodium chloride or urea or other water-soluble, non-toxic solid not soluble in the cellulose sulphuric acid, to increase the water absorbency of the film, and consequently, when placed upon bleeding tissue the blood will be absorbed faster into the film where it may be readily congealed. After the mass is whipped into a foam it may be dried at ordinary temperatures or its temperature may be reduced so that it is maintained in the frozen state and dried in a high vacuum in that state. Also, it may be frozen and then dried in the frozen state even without any whipping and in that way a porous sponge is obtained. If desired, the solubility may be decreased by heating or intensive drying, but normally this is not necessary.

Product X is converted to the fibrous state in a simple manner. In a concentrated aqueous solution of Product X there may be added alcohol or HCl which causes the cellulose sulphuric acid to precipitate out in the fibrous form simulating asbestos fibers in appearance. The liquid is then decanted and the remaining fibrous precipitate is washed two or three times with alcohol in order to dehydrate it to the extent that the fibers do not stick together and ball up in a mass, and yet sufficient water remains so that the fibers are plasticized to the desired degree. If the degree of plasticization desired is not achieved, the fibers may be placed in a vessel containing water vapor and allowed to remain therein until sufficient water has become absorbed thereby.

I find that the stability of my products toward heating is variable. In general, I find that the dialyzed product is less stable than the precipitated and washed products. This may be due to a number of causes: (1) the evaporation of the dialyzed solution may cause some decomposition, (2) the dialysis may not eliminate some unstable ingredient that is removed in washing. I find that addition of certain materials such as urea, ascorbic acid, etc. increases the stability of my products.

These materials may be sterilized either by heat or by various antiseptic materials such as formaldehyde, ethylene oxide, propylene oxide, at low temperatures in the presence of minimal amounts of moisture. They may also be sterilized by warming with mercurial, phenolic, or other antiseptic materials.

The following are specific examples illustrating some of the methods of preparation I have used to produce certain illustrative products of this invention:

*Example I*

72 cc. of chlorsulfonic acid was added to 280 cc. of cold pyridine. The product was heated to 100° C. in a glass-stoppered flask and 13.5 g. surgical cotton was added in tufts. The mixture was heated at 100° C. with occasional shaking for 1 hr. 15 min. Then the resultant mass (2) was poured into 500 cc. cold water and stirred until all lumps were dispersed. The cellulose sulphuric acid pyridine salt solution (A) so formed is precipitated with a solution of $CaCl_2$ to form the calcium salt of cellulose sulphuric acid (B). The product (A) does not precipitate with NaCl solution or concentrated HCl. A portion of the calcium chloride precipitate (B) was acidified with HCl and dialyzed through a cellophane membrane into pure water until no test for Cl was obtained. The product (B) slowly dissolves during dialysis and the dialyzed solution gives a flocculent precipitate with alcohol. The product (A) when dissolved in conc. HCl gives a fibrous precipitate with alcohol as does also the product (A) alone. Addition of 50% NaOH to (A) gives a curdy precipitate and separation of pyridine. (A) was precipitated with strong NaOH, the pyridine separated, the precipitate acidified with HCl and dialyzed. The dialyzed solution gives a curdy precipitate with alcohol and ether. After vacuum evaporation, the dialyzed solution gives a fibrous precipitate with alcohol and ether. The precipitate compacts with stirring, is hygroscopic and soluble in HCl; however, if it is first dried by washing with 95% alcohol, it does not compact and gives a dry, fibrous matte.

*Example II*

A mass (2), similar to that of Example I, was treated with solid NaOH. Heating occurred during stirring with the NaOH and a product was obtained that dialyzed

Example III 93 cc. of chlorsulfonic acid was added to 350 cc. cold pyridine and then 17 grams of tufted surgical cotton was added thereto and the mass was heated for 1½ hrs. at 100° C. The reaction mixture was then poured into 500 cc. cold $H_2O$ and stirred until completely dispersed. The cold mixture was slowly mixed with 1300 cc. of an aqueous solution containing 150 g. NaOH. 215 cc. of thick jelly formed on the bottom, the top layer was essentially pyridine and the middle layer contained some pyridine but was mostly water and salts. The jelly layer was separated from the other layer and conc. HCl added to the jelly, giving a thick, white gum. A dispersion of the acid gum was dialyzed and the product vacuum evaporated.

Example IV

A reaction mixture similar to that of Example III was poured into 500 cc. cold $H_2O$, cooled and mixed with 150 g. NaOH in 525 cc. of water. A lower layer of 890 cc. is formed with a top layer of mostly pyridine. After vacuum evaporating the lower layer, it was precipitated with alcohol, filtered and washed with alcohol to remove residual pyridine and dissolved in water. The solution was acidified with HCl and dialyzed. There were large amounts of salts in the alcohol precipitate.

Example V

A reaction mixture similar to that of Example III was separated from the pyridine layer and precipitated with insufficient alcohol to precipitate the inorganic salts present. Washing with alcohol-water mixture gives a tough, pulpy, sticky mass that dries out hard on the surface and contains no considerable amount of pyridine. A concentrated water solution of the product gives a fibrous, cotton-like product with conc. HCl that is not sticky when dry. It may be spread out into a sheet like cotton. It absorbs water like absorbent cotton. It can be stored unchanged in an alcohol-water mixture. Part of the sodium cellulose sulphate was acidified with HCl and dialyzed to a final pH of 2.2.

Example VI 1.35 grams surgical cotton heated 1½ hrs. at 100° C. with a mixture of 6.5 cc. chlorsulfonic acid and 28 cc. pyridine gave a very water-soluble product in the form of the pyridine salt of cellulose sulphuric acid.

Example VII 3 grams surgical cotton heated 1½ hrs. at 100° C. with 3 cc. chlorsulfonic acid in a large excess of pyridine (100 cc.) gives a product less soluble than that of Example VI.

Example VIII 3 grams of surgical gauze heated 1.7 hrs. at 100° C. with 3.4 cc. of chlorsulfonic acid in 35 cc. pyridine, gives a product with the gauze structure remaining, but the gauze structure disappears upon standing in water overnight.

Example IX 4 grams of surgical cotton heated 1½ hrs. at 100° C. with 2 cc. chlorsulfonic acid in 45 cc. pyridine, gives a relatively water-insoluble product.

Example X

A small piece of surgical gauze heated 18 minutes at 100° C. in 1.7 cc. chlorsulfonic acid with 15 cc. pyridine, gives a product in which the gauze structure remains for a much longer time than with the product of Example VIII above. Similar experiments, except that the heating extended only over periods of 5 and 10 minutes, gave relatively insoluble products.

Example XI

The sodium cellulose sulphate as obtained in Example IV was treated as follows: 50 g. of the salt plus 143 cc. water plus 57 cc. HCl gave a white, gelatinous precipitate. To this was added 143 cc. conc. HCl plus 214 cc. 95% alcohol. The product was filtered and washed with 143 cc. conc. HCl in 214 cc. 95% alcohol. The product was further washed with 50–50 alcohol-water until no test for Cl or $SO_4$ was given by the washings. The product was then dried with absolute alcohol and placed in a vacuum dessicator overnight. 15 grams of dry product was obtained, which was somewhat glue-like on the surface. This product was dissolved in 30 cc. water, giving a very viscous solution. The solution was dried on a glass plate in air to give a strong, flexible film which had excellent adhesion and hemostatic action when applied to bleeding animal tissue. This film could be heated at 100° C. for 1¼ hrs. without noticeable deterioration.

Example XII

A product similar to that of Example XI was dissolved in just enough water to give a very viscous solution. This solution was beaten into a froth and dried in a vacuum dessicator to give a porous, spongy mass. Another portion was frozen and dried in a high vacuum to give a similar product.

Example XIII

A product similar to that of Example XI was dissolved in water and impregnated into surgical gauze to give a pickup of 12% based on the dry material. This product was then impregnated with 18% glycerin. The material had excellent hemostatic action in bleeding animal tissue and could be removed from the clot without renewal of bleeding. Other similar products were made with 8 to 15% cellulose sulphuric acid and 15 to 25% glycerin.

Example XIV

An impure sodium cellulose sulfate prepared according to Example III and containing much $Na_2SO_4$ and NaCl was treated as follows: 80 grams of impure salt was dissolved in 229 cc. water. To this was added, with stirring, 91 cc. of 37% hydrochloric acid followed by a solution of 229 cc. 37% hydrochloric acid in 342 cc. absolute alcohol. After thorough stirring, the mixture was filtered on a fritted glass filter. It was washed on the filter with a solution of 344 cc. conc. HCl dissolved in 513 cc. alcohol. After washing with 1500 cc. of 50–50 alcohol-water solution, the product was free of Cl and $SO_4$. It was dried by washing with 700 cc. absolute alcohol and placed in a vacuum dessicator. The pure, dry product weighed 27 grams. It formed a strong, stable film when a solution of it was dried on a glass plate in air. The loss in weight during purification represents the weight of inorganic salts removed plus the weight of low molecular weight materials present in the cellulose sulphate compound, the elimination of which is desirable from the standpoint of purity, stability and strength of films made from solutions of the product.

Cellulose glycolic acid ethers have also been produced prior to my invention, but not in condition useful for the purpose of this invention. They may be produced in the form of the sodium salt by reacting alkali cellulose with a solution of chloracetic acid or its sodium salt. The compounds of the prior art have always contained a proportion of material insoluble in animal tissue. This is presumably either unreacted cellulose or cellulose that has been reacted too far; or it may be "cross-linked" material; that is, material in which the cellulose units have been bound together by esterification or by the formation of so-called lactone rings.

For some time products known as sodium carboxymethyl-cellulose have been on the market. I have converted such products to the acid form and found them to be inadequate for my purpose because of the undue irritation caused by the presence in them of material insoluble in animal tissue. My methods for making these acid ethers are as follows:

To alkali cellulose or a dispersion thereof produced with "Cellulose A," preferably regenerated cellulose of low degree of polymerization, I add a solution of chloracetic acid or its sodium salt, preferably adding it in successive small portions and allowing time for each portion to react before adding the succeeding portion. I use proportions of alkali cellulose and chloracetic acid such as to give me a degree of substitution between 0.5 and 2.0; that is, that the number of substituted ether groups present for each cellulose unit of the cellulose is between 0.5 and 2.0; that is, that the number of substituted ether groups present for each cellulose unit of the cellulose is between 0.5 and 2.0. If there is present material with too high a degree of substitution, I may precipitate it from aqueous solution in the form of the calcium, zinc or barium salt. I prefer to use a considerable excess of alkali in the reaction and to use sodium chloracetate in order to avoid local reduction of alkalinity and to assure no cross-linking by means of esterification. I may also prefer to use low temperatures (for example, near 0° C.) in order to avoid the formation of lactone bonds. I may also add some ZnO to the alkali which I use to form alkali cellulose, in order to obtain more complete conversion to alkali cellulose. Moist, regenerated cellulose of low degree of polymerization (for example, 100 to 800) is also desirable for the same reason. I may also use cellulose that has been dispersed at low temperature with concentrated phosphoric acid or HCl, after precipitation of the so-dispersed cellulose by dilution with water, washing and dissolving in NaOH. I may also precipitate alkali cellulose with alcohol or other precipitant in order to remove the cellulose that has not been completely converted to alkali cellulose. In order to obtain a clear dispersion of alkali cellulose I may treat cellulose (preferably of low D.P. or moist regenerated cellulose) with strong NaOH at low temperatures. I may also use the product of reaction of cellulose with a solution of sodium in liquid ammonia. In place of NaOH, I may use the quaternary ammonium bases such as the tetra alkyl ammonium hydroxides or the quaternary phosphonium bases or lithium hydroxide. Another method of removing insoluble material is to let a solution of sodium carboxymethyl cellulose stand at about 75° C. for several days or at room temperature for several weeks, at which point the solution will have thinned and much insoluble material precipitated. If desired, small amounts of iron, manganese, or other heavy metal salts may be added in order to accelerate the degradation. The clear solution may then be fractionated by alcohol, alcohol-HCl, salts, etc. or mixtures of these in order to separate out a product of the desired degree of polymerization. I may also destroy any ester linkages or lactone bonds by warming the product in alkaline solution.

Another method I have used is to precipitate the sodium carboxymethyl cellulose from dilute solution (by alcohol, for example) thus, obtaining a colloidal solution from which the insoluble material may be separated by sedimentation or centrifuging. Low molecular weight material can be removed by passage over certain ion exchange resins. In place of cellulose I may use starch or inulin. Otherwise, I may remove the soluble material from the insoluble material by partially dissolving the crude material in water or alkali solution thus separating the soluble material from insoluble material. In this manner the insoluble material, when the mass is allowed to stand, will fall to the bottom and the dispersion or solution thereabove may be decanted therefrom and is free from the insoluble component. In any case, and however produced, this substantially pure sodium salt is now converted to the acid form by treating in one of three ways:

(1) By acidifying, for example, with hydrochloric acid or hydrochloric acid and alcohol and dialyzing to remove the excess acid and sodium chloride; or (2) By contacting the solution with an ion exchange resin which is in the acid form; or (3) The acidified material may be washed with water and/or water-alcohol mixtures instead of dialyzing it.

In dialyzing the material the process may be stopped at the point where any desired pH is reached corresponding to any desired proportions of acid and salt form or the amount of hydrochloric acid employed in number one may be such that the degree of conversion is between 100 percent–20 percent. In fact the sodium salt may be converted to the acid form by dialyzing without acidification. Films which are dry to the touch, flexible and nonbrittle as well as sponges, etc. may be made as before— the latter by whipping up viscous solutions in air, freeze-drying or dehydrating with alcohol or in dry air. When these products come into contact with water, they very quickly shrivel and have a high tendency to become dissolved or dispersed in water and, therefore, could not be readily handled by the surgeon for their intended purpose. As a matter of fact, if they are applied directly to heavily bleeding tissue they tend to shrivel thereat. I have discovered that they may be converted to useful materials for their intended purpose by heating them or drying them with alcohol and/or in dry air so that their water dispersible or soluble factor is considerably reduced. They may even become relatively insoluble if this treatment is intensified.

Since the cellulose glycolic acid ether compounds do not adhere to bleeding tissue as well as do the cellulose sulphate compounds, I prefer to use the former in the form of a porous sponge. I may, however, modify this property as well as the solubility characteristics by adding cellulose sulphate compounds to the cellulose glycolic acid ether compounds.

The following examples illustrate some of the methods I have used in making hemostatic compositions of cellulose glycolic acid ether:

*Example XV*

A 3% solution of commercial high viscosity sodium carboxymethyl cellulose was acidified with HCl and dialyzed until no further test was given for Cl. The resulting solution was spread on a glass plate to dry in the air overnight. A flexible, clear film was obtained. This film shriveled immediately upon contact with water. However, when heated for one hour at 100° C., the film was relatively insoluble in water. The produce had good hemostatic action but did not adhere to bleeding tissue as well as did the cellulose sulphuric acid film. A similar dialyzed solution was vacuum evaporated and whipped into a foam with air. The product, after drying, gave a porous sponge. A similar solution was frozen and dried in a high vacuum, giving a similar spongy product.

*Example XVI*

A 3% aqueous solution of commercial high viscosity carboxymethyl cellulose, which actually is sodium salt, was kept at about 75° C. for several days until it had thinned out considerably and contained a precipitate of fibrous material. Then the fibrous material is removed and the resultant solution and the original solution were heated separately at 100° C. for five–seven days. The original material contained a precipitate of fibrous material while the aged product did not. The aged product, after precipitation with alcohol and HCl gave a dried film with good hemostatic properties.

These ethers according to this invention are thus converted by aging at temperatures which may be quite high and also at temperatures below the 75° C. set forth in Example XVI. Of course, under lower temperature conditions the time of aging will be longer, for example, when the aging is carried out at 25° C. the time will be approximately 2 to 3 months. In any case the time and temperature are so chosen that the degradation may take place to cause a precipitation and a decrease of viscosity of the solution after which, of course, the precipitate is removed. In any case, the aged products are capable of being maintained at 100° C. for five days without any appreciable precipitate being formed in that period.

While the cellulose sulphuric acid or the cellulose glycolic acid ether may be used alone, it is also within the purview of this invention to employ them in combination with ratio of the former to the latter by weight being about 5 to 95 to 95 to 5 and preferably in the range of 80 to 20 to 50 to 50. The ether in these combinations may be in either the highly or the less soluble form, depending upon what is required. It is also within the purview of this invention to employ combinations of cellulose sulphuric acid and/or the sodium salt of cellulose sulphuric acid and the highly or less soluble cellulose glycolic acid ether and/or its sodium salt.

These combinations permit a finer control of viscosity and solubility as well as adhesion to animal tissue.

Still another class of compounds which are suitable for the purpose of this invention are the sulphuric acid esters of the cellulose glycolic acid ethers. These may be produced by first producing these ethers in low degree of substitution, drying, and then treating with chlorosulfonic acid in the presence of pyridine, etc. These compounds may be purified as before, and may be employed in combination with the other hemostatic compounds of this invention in the ratio by weight of 10–90 to 90–10.

I may also, in certain instances, use other cellulose derivatives, such as the phosphate esters of cellulose or the cellulose phosphoric acid compounds, formed in ways analogous to those used to make the cellulose sulfuric acid compounds. I may also use the soluble hydrated cellulose materials formed by treating cellulose with very strong hydrochloric acid at low temperature, washing the precipitate formed by diluting the dispersion with water and keeping the washed product in a moist but not wet condition. Such hydrated cellulose may be made slightly acid with a weak acid such as acetic acid or impregnated with a slightly soluble acid or an acid salt such as ferric chloride.

In certain cases I may use cellulose glycollic acid ether and/or cellulose sulfuric (in mixtures with each other and/or their salts), particularly in the form of highly porous sponges of very low density, as packing material for wounds and/or as absorbable carriers of medicaments, antiseptics, antibiotics, spermaticides, etc. For this purpose their hemostatic properties may be reduced, for example, by using a considerable proportion of their salts, for example their sodium salts. The presence of their sodium salts will also increase their solubility and, as previously stated, may be used to control their pH in order to obtain maximal acceptability in the tissues and to provide a suitable environment for the medicament, etc. used. For example: a spermaticide may require an acid environment; use on the skin or in the vagina may likewise be more compatible with an acid reaction; certain antibiotics, as for example aureomycin, may be more stable in an acid environment or may exist in the packing material or dressing as the salt of the cellulose glycolic acid ether or the cellulose sulfuric acid or as the hydrochloride or other salt of the organic base of aureomycin. I may also use such compositions as coatings or impregnants in cotton, gauze, etc. or as ointments, pastes, etc. with aqueous or non-aqueous materials such as vegetable gum, methyl cellulose, polyglycols (carbowax), or petrolatum.

I may also use alginic acid as a raw material in producing hemostatic compositions. While sodium alginate (algin) and calcium alginate have previously been proposed, I use alginic acid which I prepare by the methods described herein and in the special forms I have described in connection with the preparation of acid forms of carboxymethyl cellulose and cellulose sulphate. Especially, I may age aqueous solutions of the very viscous alginic acid in order to eliminate insoluble material and produce material of suitable molecular weight. Alginic acid is especially suitable as a hemostatic agent, in the form of an absorbent fibrous matte or a porous sponge. I may also carboxymethylate alginic acid or sulphate it with pyridine and chlorsulfonic acid to form glycollic acid ether or sulphate derivatives of alginic acid; since alginic acid has only one carboxyl group per cellulose unit.

All of the various compounds and combinations of compounds of this invention may also be employed as coatings on and also as impregnants in cotton gauze or the like, either with or without humectants and/or medicaments and/or urea, etc. In the use of cellulose or regenerated cellulose (cotton, gauge, viscous rayon, paper, etc.) backing materials or carriers impregnated or coated with my hemostatic compositions, I may choose to make the cellulose itself slowly absorbable in animal tissue as follows. I partially oxidize the cellulose with oxidizing agents such as permanganate, hypochlorite, hypobromite, hydrogen peroxide, chlorite, $NO_2$, etc. to an extent where a certain amount of oxidation of the cellulose takes place and so-called "reaction centers" are produced, but not enough to destroy the strength and form of the material. I then impregnate the cellulose with a solution of a metal salt of iron, cerium, chromium, manganese, etc. and precipitate the metal in the fibers of the cellulose with alkali to yield the insoluble oxide, hydroxide, or hydrated oxide of the metal. The impregnated cellulose is then thoroughly washed with distilled water in order to thoroughly peptize the material throughout the cellulose. I then have the cellulose partially oxidized and impregnated with an active oxidation catalyst so that if left in animal tissue the cellulose backing itself will slowly degrade and dissolve through the action of the oxygen in the tissue fluids, during the course of days, weeks, or months depending upon the extent to which the cellulose is oxidized originally. I may prefer to oxidize and impregnate the cellulose in the form of a dispersion (for example, a dispersion made at low temperatures in strong HCl) in order to obtain thorough and uniform treatment. I may oxidize and impregnate with oxidation catalyst in the same operation. For example, I dip an air-dry regenerated cellulose cloth or gauze into a solution of potassium permanganate and ferric chloride for several minutes at room temperature, then pad it in a dilute solution of NaOH in order to precipitate the insoluble hydroxides of manganese and iron (the amounts of dry hydroxide being up to a few tenths of a percent of the weight of dry cloth) and then wash the cloth thoroughly with distilled water. If the cloth has lost considerable strength in the process, coating or impregnating it with cellulose glycolic acid ether and heating to insolubilize the ether will greatly improve the strength of the cloth. Or, I may coat or impregnate the cloth with a neutral solution of sodium carboxymethyl cellulose and then precipitate in the cloth the insoluble iron carboxymethyl cellulose by treating with an iron salt solution. In fact, these treatments greatly improve the normally poor wet strength of regenerated cellulose fiber. The cloth or paper so treated may be further impregnated or coated with one of my hemostatic materials. Thus, when and if such materials or fibers from them are left in the wound, they eventually dissolve. I may use such oxidation methods and catalysts to increase the rate of absorption of my hemostatic materials themselves. In storage, however, I may use a soluble anti-oxidant like ascorbic acid to preserve them until they are placed in animal tissue when the soluble anti-oxidant is dissolved out in the tissue fluids. They may all be sterilized as indicated for the cellulose sulphuric acid compounds. The impregnated products will usually be sterilized in contact with steam, in which case even though the impregnating compounds melt, they will still remain adherent to the cotton or gauze.

For some purposes, for example where I wish to use my compounds in surgery as materials which adhere to bleeding animal tissue and persist for some time, I may wish to have them only very slowly soluble. This I do by cross-linking the compounds, for example, through reaction with epichlorhydrin, esterification of the acid forms with polyhydric alcohols, or by reaction with formaldehyde.

I may also wish to separate out from my compounds products within certain molecular weight ranges. This I do by fractional precipitation with alcohols or HCl, or by fractional solution in water or alkali solution, or by fractional precipitation as sodium, calcium or other salts.

While I have described certain methods of producing the materials of the present invention, it will be evident that considerable modification and variation of my methods can be made without departure from the spirit of my invention.

By cellulose sulphate ester or sulfuric acid ester of cellulose I mean either cellulose hydrogen sulphate or the acid form. Cellulose sulphate esters produced by the reaction of cellulose with chlorsulphonic acid is preferred for the purposes of the invention rather than that made with sulfuric acid.

I claim:

1. A sterile hemostatic material selected from the class consisting of a partially hydrated high molecular weight cellulose glycollic acid ether and a cellulose sulphuric acid ester non-toxic and non-irritating in animal tissue, said material being in solid form dried to the extent that it does not quickly shrivel or dissolve in water at 100° F. but insufficient to become brittle, said material having the physical characteristics of substantial capillary porosity so that it is quickly wet by, absorbs and coagulates the blood of mammals, said product being substantially free of material which quickly dissolves in water on contact and contains no substantial amount of material which is not absorbed in the tissues within a thirty-day period.

2. A sterile hemostatic material comprising partially hydrated high molecular weight cellulose glycollic acid ether in solid form dried to the extent that it does not quickly shrivel or dissolve in water at 100° F. but insufficient to become brittle, said material having the physical characteristics of substantial capillary porosity so that it is quickly wet by, absorbs and coagulates the blood of mammals, said product being substantially free of material which quickly dissolves in water on contact and contains no substantial amount of material which is not absorbed in the tissues within a thirty-day period.

3. The product of claim 2 having the physical form of a porous sponge.

4. The product of claim 2 wherein cellulose sulfuric acid ester is used in place of the cellulose glycollic acid ether.

5. The product of claim 4 in the form of a porous sponge.

6. A hemostatic product composed of a mixture of the products defined by claims 2 and 4.

7. The product of claim 2 in the form of a film.

8. The product of claim 4 in the form of a film.

References Cited in the file of this patent

UNITED STATES PATENTS

| 1,734,291 | Gebauer-Feulnegg | Nov. 5, 1929 |
| 2,025,073 | Rigby | Dec. 24, 1935 |
| 2,163,588 | Cornish | June 27, 1939 |
| 2,484,637 | Mattocks | Oct. 11, 1949 |
| 2,508,433 | Synder | May 23, 1950 |
| 2,517,772 | Doub et al. | Aug. 8, 1950 |
| 2,559,914 | Frank | July 10, 1951 |
| 2,591,742 | Thomas | Apr. 8, 1952 |

FOREIGN PATENTS

| 603,571 | Great Britain | June 18, 1948 |
| 490,432 | Great Britain | Aug. 15, 1938 |
| 428,839 | Canada | July 17, 1945 |

OTHER REFERENCES

Marks: J. Missouri M. A., December 1948, pp. 894–895.

Blaine: Annals of Surgery, January 1947, pp. 102–106.

Ott: "Cellulose and Its Derivatives," 1943, pp. 663-665 and 784–787.

Heuser: "Cellulose Chem.," 1944, pp. 167–172 and 282.

Piper: Acta Pharmalogica et Toxilogica, vol. 2, June 21, 1946, pp. 138–148.